United States Patent
Gelbart

(12) 
(10) Patent No.: US 6,217,965 B1
(45) Date of Patent: Apr. 17, 2001

(54) FLEXOGRAPHIC VARNISHING PLATES

(75) Inventor: Daniel Gelbart, Vancouver (CA)

(73) Assignee: Creo Srl, Burnaby (CA)

(*) Notice: Subject to any disclaimer, the term of this patent is extended or adjusted under 35 U.S.C. 154(b) by 0 days.

(21) Appl. No.: 08/862,370

(22) Filed: May 23, 1997

(51) Int. Cl.$^7$ .................................................... B32B 9/00
(52) U.S. Cl. ................ 428/41.9; 428/40.1; 428/41.3; 428/41.5; 428/41.7; 428/42.1; 428/42.2; 428/913; 430/253; 430/256; 430/258; 430/260
(58) Field of Search ................. 428/40.1, 41.3, 428/41.5, 41.7, 42.1, 42.2, 41.9, 913; 430/253, 256, 258, 260

(56) References Cited

U.S. PATENT DOCUMENTS

| | | | |
|---|---|---|---|
| 4,181,752 | * 1/1980 | Martens et al. | 427/54.1 |
| 4,820,746 | * 4/1989 | Rice et al. | 522/127 |
| 4,917,990 | * 4/1990 | Herrmann | 430/286 |
| 5,166,226 | * 11/1992 | Rice et al. | 522/127 |
| 5,484,684 | * 1/1996 | Telser et al. | 430/253 |

* cited by examiner

Primary Examiner—Nasser Ahmad
(74) Attorney, Agent, or Firm—Oyen Wiggs Green & Mutala

(57) ABSTRACT

A flexographic varnishing plate, used for the selective application of varnish over printed areas, is made by cutting an elastomeric layer bonded to a clear substrate with a pressure-sensitive adhesive. The elastomer is peeled off from the areas which should not be varnished and an exposure to ultra-violet light increases the strength of the adhesive holding the remaining elastomer to the substrate. The plate can be used on lithographic and flexographic printing presses.

8 Claims, 1 Drawing Sheet

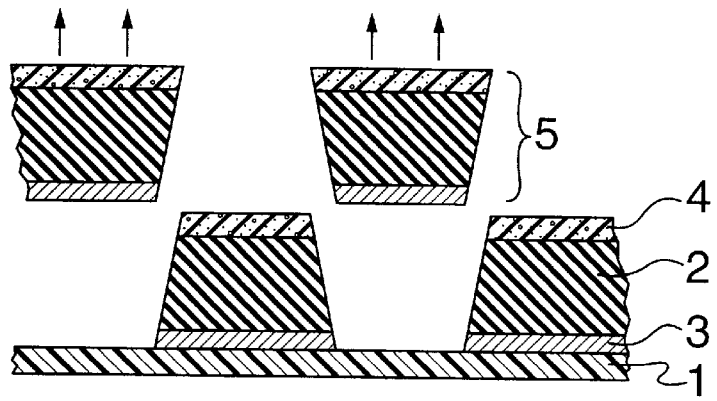
FIG. 1
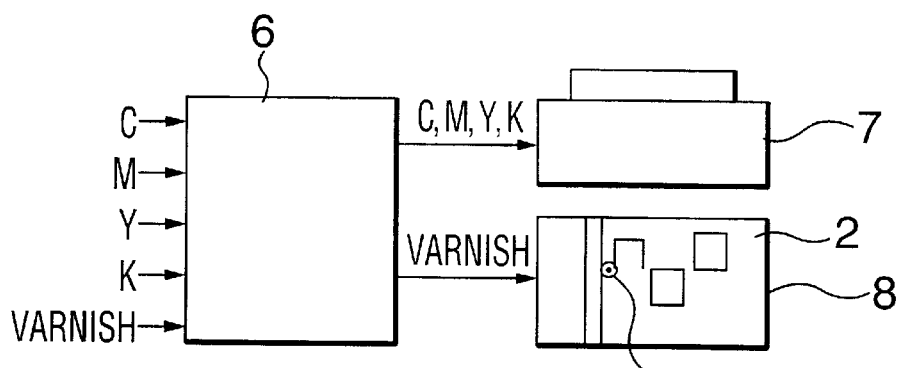
FIG. 2
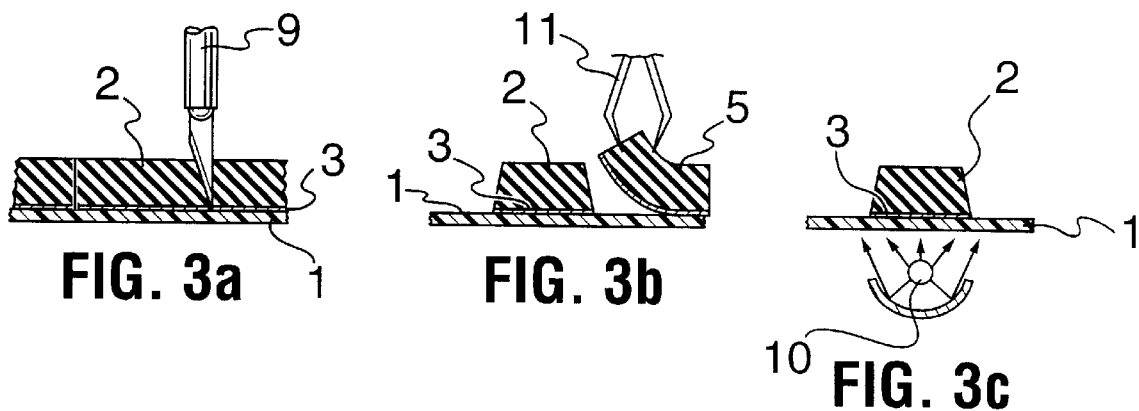
FIG. 3a  FIG. 3b  FIG. 3c

FLEXOGRAPHIC VARNISHING PLATES

FIELD OF INVENTION

The invention relates to printing and more specifically to printing with elastomeric plates, a field known as flexography.

BACKGROUND OF THE INVENTION

In printing it is often required to add an overcoat of varnish on top of the printed area in order to change gloss, scratch resistance, water resistance or other properties. The varnish is normally clear but special coatings such as adhesives, metallic coatings, special colors etc. can also be used. The selective application of varnish is administered using flexographic plates which are generated by exposing a photo-polymer and washing away the unexposed areas. Photo-polymer flexographic plates are expensive and require a long preparation process. For simple jobs a cut rubber sheet mounted with pressure-sensitive adhesive can be used, however any adhesive sufficiently weak to allow peeling off the undesired rubber is also too weak for extended printing runs, in particular when the varnish used can dissolve the adhesive. The use of plates based on pressure sensitive adhesive is discussed in U.S. Pat. No. 5,484,684, in which a narrow range of peel strength was selected as a best compromise between durability and ease of peeling. It is an object of the invention to provide a low cost flexographic plate particularly suitable for spot varnishing which is easy to prepare by peeling the unneeded elastomer but which is durable when used with a wide range of varnishes and other coatings. Another object is to provide a durable plate not requiring any chemicals during the platemaking process. A third object is to provide a flexographic varnishing plate with better varnish carrying capability than photo-polymer plates, in particular for water based varnishes. Current plates perform poorly with water based varnishes as most elastomeric photo-polymers are hydrophobic and are not wetted properly by a water based coating.

SUMMARY OF THE INVENTION

The invention discloses a method of preparing a flexographic printing plate. The printing plate may have at least three layers including a dimensionally stable substrate layer, an elastomer layer, and a curable adhesive layer therebetween. The method of preparation of the flexographic plate may comprise the steps of imagewise cutting the elastomer layer (outlining a border between the "printing areas" and the "non-printing areas" of the plate), peeling the elastomer layer from the substrate layer in the non-printing areas, and curing the adhesive layer between the remaining elastomer layer and the substrate in the printing areas.

The curing step may increase the adhesion strength between the elastomer layer and the substrate, making it possible to use the flexographic plate in extended printing runs. Curing may be achieved in a number of ways including U.V. irradiation of a photo-sensitive adhesive and heating a thermo-sensitive adhesive. A transparent substrate, such as polyester, is particularly well suited for the U.V. curing process.

The cutting step may be executed with a sharp blade cutting tool or alternatively with a laser cutting tool, both of which may be computer controlled. Finally, a top coat may be applied to the elastomer layer in order to increase its surface energy or to give it some other selected property to improve the functionality of the flexographic printing plate.

The U.V. exposure cross-links the adhesive and renders it insoluble in most liquids used in varnishing and coatings. Since the elastomer is mechanically cut and need not be photo-sensitive, the choice of elastomers is significantly wider than in photo-sensitive plates. For example, a hydrophilic top layer can be added to the elastomer for improved wetting by water based coatings.

DESCRIPTION OF THE DRAWINGS

FIG. 1 shows a cross-section of a flexographic plate according to the invention.

FIG. 2 shows, in block diagram form, the method of preparing the plate by cutting the outline of the varnished areas in register with the printed image.

FIG. 3-a shows a cross-section of the first step in preparing the plate (cutting the elastomer).

FIG. 3-b shows a cross-section of the second step in preparing the plate (peeling the undesired elastomer).

FIG. 3-c shows a cross section of the third step in preparing the plate (curing the adhesive using U.V. light).

DESCRIPTION OF THE PREFERRED EMBODIMENT

A flexographic printing plate suitable mainly for printing large features such as varnishing or large text is made by mechanically cutting the outlines of the raised areas and peeling off the undesired elastomer. Referring now to FIG. 1, an elastomer layer 2 is attached to a dimensionally stable substrate 1 using a curable pressure sensitive adhesive layer 3. A top layer 4 can be used to impart specific properties such as a hydrophilic surface for better wetting by water based coatings. If top coat 4 is used it typically has a higher surface energy than bare elastomer for improved wetting by the coating liquid. Elastomer 2 can be made from a wide range of elastomeric materials since no photo-sensitivity or chemical activity is required. A good choice is natural rubber, but a wide range of materials, including filled materials and foams can be used. Substrate 1 is preferably made of polyester, as it combines dimensional stability, low cost and is transparent to the U.V. radiation needed to cure adhesive layer 3. If the adhesive is cured with heat or radiation other than light, substrate 1 need not be transparent and a metal substrate may be preferred. Metal can also be used for a substrate if elastomer layer 2 is transparent to the radiation used. After cutting the desired outlines, using a computer controlled knife cutter or laser cutter, undesired material 5 is peeled off and the bond of the remaining elastomer to substrate 1 is strengthened by the application of radiation or heat. The application of radiation or heat serves two purposes: 1) it greatly increases the peel-off strength of raised elastomer pads and, 2) it allows long print runs by making the adhesive resistant to attack by the solvents present in the coatings or varnishes. Both benefits are typically the result of chemically cross-linking the adhesive. Cross linking is not the only method of improving the bond after peeling. Melting of the adhesive layer and other physical or chemical changes can be used. The curing process can be achieved in many ways. The main ones are:

1. Application of U.V. light through a transparent substrate.
2. Application of U.V. light through a transparent elastomer.
3. Application of Infra-Red (I.R.) light in order to heat the elastomer. I.R. radiation can be applied through the substrate or through the elastomer.

4. Application of heat by conduction or convection, using a method such as heading with a hot plate or oven.

5. Application of Electron Beams.

The use of U.V. light to cure the adhesive is preferred as the equipment for U.V. irradiation, known as a "vacuum frame" or "plate exposure frame" already exists at most printing shops. Many U.V. curable pressure sensitive adhesives are available from suppliers such as 3M (Minn., Minn). A formulation of such an adhesive is disclosed in U.S. Pat. No. 5,166,226 which is hereby incorporated by reference as part of this disclosure.

Referring now to FIG. 2, the data describing the location of the coated or varnished areas is supplied together with the data to be printed, shown as C, M, Y, K (for Cyan, Magenta, Yellow and Key) to a computer system 6. The C, M, Y, K data is used to generate printing plates using a platesetter 7. The coating or varnishing data, treated as another layer by computer system 6, is fed to a computer controlled cutter 8. A blade 9 cuts the elastomer 2 in register with C, M, Y, K layers.

No further data is given about computer system 6, platemaker 7 and cutter 8 as these are widely used commercially available systems. Because elastomer 2 is cut using the same data as the printing plates, the raised "printing areas" of the elastomer are in good register to the printed images.

Referring now to FIG. 3-a, blade 9 is cutting elastomer layer 2 and adhesive layer 3 but not substrate 1. This is achieved by controlling the depth of cut or by making the substrate 1 much harder than elastomer layer 2 and cutting under constant pressure. Alternately, laser cutting using a focused carbon-dioxide laser can be employed using the dwell time to control the depth of cut. In FIG. 3-b, the undesired elastomer 5 is peeled off manually, using tweezers, or by equipping the automatic cutter with a tweezer-like attachment for mechanized peeling. At this stage peeling is easy since adhesive 3 is weak, similar to familiar "peel off" labels. After peeling is complete, the whole plate is exposed to radiation. The preferred embodiment uses U.V. radiation from U.V. lamp 10, passing through transparent substrate 1, as shown in FIG. 3-c,. After irradiation, the peel strength of adhesive 3 greatly increases, does as the ability of the adhesive to resist solvents. In the preferred embodiment existing U.V. platemaking equipment commonly available in print shops, is used for the U.V. curing.

EXAMPLE 1

A layer of 60 durometer natural rubber (from CTI, South Carolina) having a thickness of about 1 mm (0.040") and a matte finish is bonded to a polyester substrate of 0.2 mm (0.008") using a U.V. curable pressure sensitive adhesive prepared per U.S. Pat. No. 5,166,226 and coated to a thickness of about 0.0025 mm (0.001") onto the rubber. The flexographic plate formed this way has a total thickness of about 1.22 mm (0.049") and very good varnish carrying capability due to the natural rubber layer. The plate is cut in register with the data to be printed using a Graphtec Model FC2200 cutter (Western Graphtec, Irvine, Calif.) connected to a Creo Trendsetter Computer-to-Plate system via an HPGL interface (all from Creo Products Inc., Vancouver, BC, Canada). After cutting, the undesired rubber is peeled off, leaving a flexographic plate having raised rubber in areas where coating is required. The finished plate is placed in a regular U.V. exposure frame used for production of lithographic printing plates with the substrate facing the light source. After 20 minutes of irradiation the peel strength of the adhesive improved to over 10 N/cm. The plate was placed in a flexographic coating tower of an offset press and used as a spot varnish plate.

EXAMPLE 2

Same as example 1, except a 0.025 mm (0.001") layer of Poly Vinyl Alcohol (PVA) was coated on top of the rubber and dried. The plate was used for coating water based acrylic varnish. Wetting of the PVA layer by the water based varnish was excellent.

What is claimed is:

1. A flexographic printing plate comprising:

a) an elastomer layer, b) a dimensionally stable substrate; and c) a photosensitive adhesive layer removably bonding the elastomer layer to the substrate;

wherein a peel strength of the adhesive layer is increasable from a pre-irradiation peel strength to a post-irradiation peel strength which is significantly greater than the pre-irradiation peel strength by irradiating the printing plate with ultraviolet light and at least one of the elastomer layer and the substrate are substantially transparent to ultraviolet light capable of increasing the peel strength of the adhesive layer;

the pre-irradiation peel strength is low enough to allow non printing areas of the elastomer layer, as defined by cuts in the elastomer layer, to be peeled-off the substrate, but high enough to prevent significant movement relative to the substrate of the un-peeled portions of the elastomer layer as the non-printing areas are peeled-off the substrate; and, the post-irradiation peel strength is great enough to prevent significant movement relative to the substrate of the un-peeled portions of the elastomer layer during printing.

2. A flexographic printing plate comprising:

a) an elastomer layer, b) a dimensionally stable substrate; and c) a thermosensitive adhesive layer removably bonding the elastomer layer to the substrate;

wherein a peel strength of the adhesive layer is increasable from a pre-heating peel strength to a post-heating peel strength which is significantly greater than the pre-heating reel strength by heating;

the pre-heating peel strength is low enough to allow the non-printing areas of the elastomer layer, as defined by cuts in the elastomer layer, to be peeled-off the substrate, but high enough to prevent significant movement relative to the substrate of the un-peeled portions of the elastomer layer as the non-printing areas are cut and peeled-off; and, the post-heating peel strength is great enough to prevent significant movement relative to the substrate of the un-peeled portions of the elastomer layer during printing.

3. The printing plate of claim 1, wherein the substrate is made of polyester.

4. The printing plate of claim 1, wherein said elastomer layer has a top coat made of a material having a higher surface energy than said elastomer layer.

5. The printing plate of claim 1, wherein the elastomer layer is substantially transparent to ultraviolet light capable of increasing the peel strength of the adhesive layer.

6. The printing plate of claim 1, wherein the substrate is substantially transparent to ultraviolet light capable of increasing the peel strength of the adhesive layer.

7. The printing plate of claim 2 wherein the substrate comprises a sheet of metal.

8. A flexographic printing plate comprising:
   a) an elastomer layer,
   b) a dimensionally stable substrate; and
   c) an adhesive layer removably bonding the elastomer layer to the substrate;
      wherein a peel strength of the adhesive layer is increasable from a pre-irradiation peel strength to a post-irradiation peel strength which is significantly greater than the pre-irradiation peel strength by irradiating the adhesive layer with an electron beam;
      the pre-irradiation peel strength is low enough to allow non-printing areas of the elastomer layer, as defined by cuts in the elastomer layer, to be peeled-off the substrate, but high enough to prevent significant movement relative to the substrate of the un-peeled portions of the elastomer layer as the non-printing areas are peeled-off the substrate; and,
      the lost-irradiation peel strength is great enough to prevent significant movement relative to the substrate of the un-peeled portions of the elastomer layer during printing.

\* \* \* \* \*